United States Patent
Okamura et al.

(10) Patent No.: US 8,178,220 B2
(45) Date of Patent: May 15, 2012

(54) SURFACE-COVERED CUBIC BORON NITRIDE SINTERED BODY TOOL AND METHOD OF MANUFACTURING THE SAME

(75) Inventors: Katsumi Okamura, Itami (JP); Satoru Kukino, Itami (JP); Tomohiro Fukaya, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 860 days.

(21) Appl. No.: 11/579,138

(22) PCT Filed: Feb. 28, 2005

(86) PCT No.: PCT/JP2005/003295
§ 371 (c)(1),
(2), (4) Date: Oct. 30, 2006

(87) PCT Pub. No.: WO2005/105348
PCT Pub. Date: Nov. 10, 2005

(65) Prior Publication Data
US 2008/0193724 A1    Aug. 14, 2008

(30) Foreign Application Priority Data
Apr. 30, 2004 (JP) ................................. 2004-136816

(51) Int. Cl.
*B32B 9/00* (2006.01)
(52) U.S. Cl. ......... 428/698; 51/307; 51/309; 204/192.1; 407/119; 428/697; 428/699
(58) Field of Classification Search .............. 428/698, 428/697, 699; 407/107, 113–119; 51/307, 51/309; 204/192.1
See application file for complete search history.

(56) References Cited

U.S. PATENT DOCUMENTS

| 4,755,399 A | * | 7/1988 | Fujii et al. ................ 427/249.17 |
| 5,139,537 A | * | 8/1992 | Julien ............................ 51/293 |

(Continued)

FOREIGN PATENT DOCUMENTS

CN    1347785 A    5/2002

(Continued)

OTHER PUBLICATIONS

Rointan F. Bunshah, Handbook of Deposition Technologies for Films and Coatings, No Month 1994, Noyes Publications, 2nd Ed., pp. 350 and 354.*

(Continued)

*Primary Examiner* — Archene Turner
(74) *Attorney, Agent, or Firm* — McDermott Will & Emery LLP (57) ABSTRACT

A surface-covered CBN sintered body tool includes a base material formed with a cubic boron nitride (CBN) sintered body and a surface covering film covering a surface of the base material, and has a nega-land exposing the CBN sintered body in at least a portion thereof and a flank having the surface covering film formed thereon. With this, the surface-covered CBN sintered body tool having high defect resistance and wear resistance can be provided. The surface covering film preferably includes a nitride or a carbonitride of a compound including at least one element selected from the group consisting of Ti, Cr, Zr, and V and at least one element selected from the group consisting of Al, Si and B, or a nitride or a carbonitride of Ti.

15 Claims, 2 Drawing Sheets

U.S. PATENT DOCUMENTS

| | | | |
|---|---|---|---|
| 5,477,754 A | 12/1995 | Herbon | |
| 5,712,030 A * | 1/1998 | Goto et al. | 428/332 |
| 5,813,105 A | 9/1998 | Littecke et al. | |
| 6,410,121 B1 * | 6/2002 | Abukawa | 428/697 |
| 6,599,062 B1 | 7/2003 | Oles et al. | |
| 6,612,786 B1 | 9/2003 | Kanada et al. | |
| 6,737,178 B2 * | 5/2004 | Ota et al. | 428/698 |
| 2002/0048696 A1 | 4/2002 | Kukino et al. | |

FOREIGN PATENT DOCUMENTS

| | | |
|---|---|---|
| DE | 85 29 043.2 U1 | 2/1987 |
| EP | 0413227 * | 8/1990 |
| EP | 1 231 004 A1 | 8/2002 |
| JP | 55150941 A * | 11/1980 |
| JP | 06-206104 | 7/1994 |
| JP | 8-99201 | 4/1996 |
| JP | 8-174309 | 7/1996 |
| JP | 08-318411 | 12/1996 |
| JP | 10-180508 | 7/1998 |
| JP | 2001-212703 A | 8/2001 |
| JP | 2002-003284 | 1/2002 |
| JP | 2002-219604 | 8/2002 |
| JP | 2002-301605 | 10/2002 |

OTHER PUBLICATIONS

Translation of JP55150941 A, Murai, S et al., Nov. 1980.*
Chinese Office Action with written opinion and English Translation issued in Chinese Patent Application No. CN 2005-80013726.8 dated on Apr. 4, 2008.
Japanese Notice of Grounds of Rejection, with English Translation, issued in Japanese Patent Application No. 2006-512728, mailed on Jan. 5, 2010.
European Search Report issued in European Patent Application No. 05719623.0-2302/1741505 PCT/JP2005003295, dated Aug. 10, 2010.
European Office Action, issued in European Patent Application No. 05 719 623.0, dated Sep. 22, 2011.

* cited by examiner

SURFACE-COVERED CUBIC BORON NITRIDE SINTERED BODY TOOL AND METHOD OF MANUFACTURING THE SAME

RELATED APPLICATIONS

This application is the U.S. National Phase under 35 U.S.C. 371 of International Applications No. PCT/JP2005/003295 filed on Feb. 28, 2005, which in turns claims the benefit of JP 2004-136816 filed on Apr. 30, 2004.

TECHNICAL FIELD

The present invention relates to an improvement in a material for a tool which has, as a base material, a sintered body including cubic boron nitride as a main component and has a surface covered with a thin film.

BACKGROUND ART

Cubic boron nitride (hereafter abbreviated as "CBN") is a material having high hardness after diamond and low reactivity with metals, and therefore, a sintered body thereof is used for a tool for cutting a heat resistant alloy or quenched steel. Even for the CBN sintered body having such high hardness, a surface covering film is formed thereon to prevent wear of an edge portion.

Patent Document 1 discloses a hard film-covered very high temperature and high pressure sintered body characterized in that peak intensity from a specific crystal surface of a surface covering film (coating) on a CBN sintered body during X-ray diffraction has a specific relation. In this technique, it is proposed to process a cutting edge with beveling or into a honed shape such as an R shape to prevent nicking or chipping. It is also disclosed that when a thickness of the coating decreases toward a cutting edge ridgeline portion, properties regarding peeling of the coating and minute chipping of the cutting edge are improved.

Patent Document 1: Japanese Patent Laying-Open No. 2002-3284

DISCLOSURE OF THE INVENTION

Problems to be Solved by the Invention

With the technique disclosed in Patent Document 1, however, especially when the tool is used for interrupted cutting, a crack is generated with an intermittent impact on the coating formed with ceramics which has lower strength and toughness than the CBN sintered body. When the cutting is continued, the crack propagates to the CBN sintered body as a base material, because the base material and coating are strongly joined together. Moreover, it turned out that the crack further propagates to cause chipping of the CBN sintered body and life of the tool is thus ended.

Accordingly, a main object of the present invention is to provide a surface-covered CBN sintered body tool which can suppress cracking and chipping of a nega-land (a portion formed by beveling a cutting edge ridgeline along a cutting edge with a substantially uniform width in order to strengthen an edge portion of a tool) to decrease wear of a flank even in a situation of interrupted cutting of a high hardness material such as quenched steel, and to provide a method of manufacturing the same.

Means for Solving the Problems

The present invention is a surface-covered cubic boron nitride sintered body tool (a surface-covered CBN sintered body tool) which includes a base material formed with a cubic boron nitride (CBN) sintered body and a surface covering film covering a surface of the base material, and in which a nega-land exposing the cubic boron nitride sintered body in at least a portion thereof and a flank having the surface covering film are formed.

Herein, a CBN particle in the CBN sintered body exposed preferably contains at least one of Ti, Cr, Zr, V, and Ar at a depth of at least 0.05 μm from a surface of the CBN particle with a content of at most an amount of an unavoidable impurity.

The surface covering film in the present invention preferably includes a nitride or a carbonitride of a compound including at least one element selected from the group consisting of Ti, Cr, Zr, and V and at least one element selected from the group consisting of Al, Si and B, or a nitride or a carbonitride of Ti.

In addition, in the surface-covered CBN sintered body tool of the present invention, it is preferable that (1) the CBN sintered body be exposed in a whole portion of the nega-land, or (2) the CBN sintered body be exposed in at least a portion of the nega-land associated with a cutting cross section.

In the surface-covered CBN sintered body tool of the present invention, the nega-land preferably has a width W of 0.05-0.2 mm.

In the surface-covered CBN sintered body tool of the present invention, arithmetic mean surface roughness Ra of a portion of the nega-land exposing the CBN sintered body is preferably expressed as $0.3 \leqq Ra(min)/Ra(max) \leqq 0.8$, where Ra(min) represents surface roughness in a direction parallel to a grinding direction of a grinder and Ra(max) represents surface roughness in a direction perpendicular to the grinding direction of the grinder.

The present invention also provides a method of manufacturing a surface-covered CBN sintered body tool which includes the steps of: forming a surface covering film with a PVD method on a surface of a tool material having a cutting edge portion of a CBN sintered body, which surface covering film includes a nitride or a carbonitride of a compound including at least one element selected from the group consisting of Ti, Cr, Zr, and V and at least one element selected from the group consisting of Al, Si and B, or a nitride or a carbonitride of Ti; and forming a nega-land to expose the CBN sintered body in at least a portion thereof.

The method of manufacturing a surface-covered CBN sintered body tool of the present invention preferably further includes the step of honing at least a portion of a periphery of the nega-land after the step of forming the nega-land.

Effects of the Invention

With the present invention including a construction in which the CBN sintered body as the base material is exposed in at least a portion of the nega-land, a surface-covered CBN sintered body tool can be attained which avoids cracking of a surface covering film of a nega-land which occurs in a conventional tool and suppresses chipping, and has high defect resistance and wear resistance. The surface-covered CBN sintered body tool as such can be suitably used particularly for a purpose in which defect resistance of the tool is required, such as interrupted cutting of quenched steel.

In addition, though the present invention includes a construction in which the surface covering film is formed on the flank, since a work material does not initially strike the flank at biting of the edge portion during the interrupted cutting, a crack is not easily generated on the flank even when the surface covering film is formed thereon, and wear of the flank is suppressed with the surface covering film without decreasing life of the tool, which can attain a long-life tool. It is to be noted that, though a phenomenon in which a crack is not easily generated on the surface covering film of the flank in the tool of the present invention is markedly observed especially in the interrupted cutting, a similar effect is also obtained in continuous cutting.

DESCRIPTION OF THE REFERENCE CHARACTERS 1 surface-covered CBN sintered body tool; 2 base material; 3 surface covering film; 4 nega-land; 5 flank; 6 base; 7 notch portion; 40 tool material; and W width of nega-land.

BEST MODE FOR CARRYING OUT THE INVENTION

Embodiments of the present invention will now be described in the following.

Figure 1:
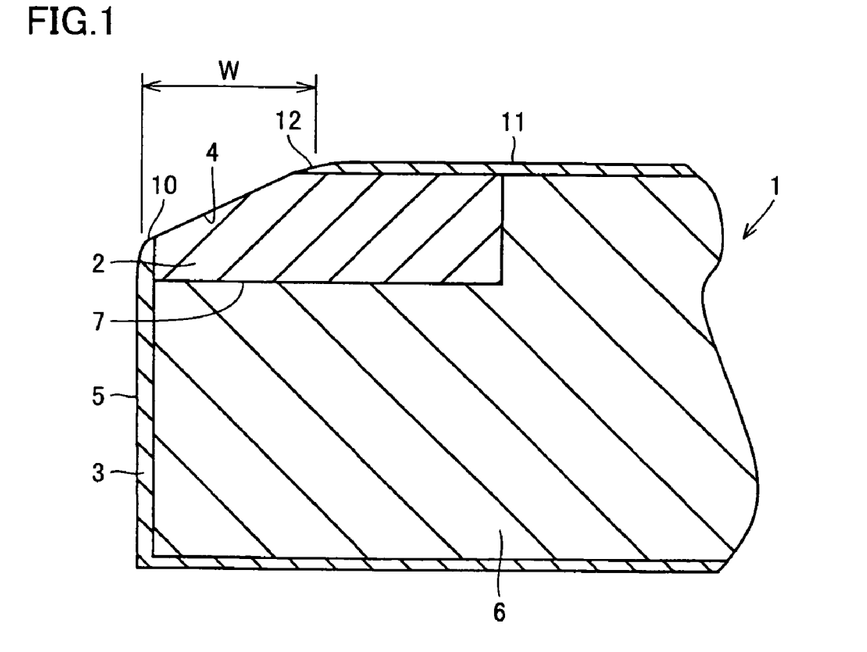
FIG. 1 is a cross-sectional view of a surface-covered CBN sintered body tool according to the present invention.

FIG. 1 is a schematic cross-sectional view of a surface-covered CBN sintered body tool 1 as a preferred example of the present invention. Surface-covered CBN sintered body tool 1 of the present invention includes a base material 2 formed with a CBN sintered body and a surface covering film 3 covering a surface of base material 2, and has a basic construction in which a nega-land 4 exposing the CBN sintered body in at least a portion thereof and a flank 5 having surface covering film 3 are formed.

Surface-covered CBN sintered body tool 1 of the present invention may be constructed such that base material 2 is attached to a base 6 to use base material 2 as a cutting edge portion, or may be formed with base material 2 in whole. When base material 2 is attached to base 6, a resulting structure may be of a one-layer type in which only base material 2 is attached, or may be of a two-layer type in which base material 2 and a cemented carbide are attached. FIG. 1 exemplarily shows the one-layer type surface-covered CBN sintered body tool 1 formed by attaching merely base material 2 to base 6.

Base 6 is formed with a cemented carbide such as a WC—Co alloy. A shape of base 6 is generally selected as appropriate with a tool model number without specific limitation. In the example shown in FIG. 1, the base has a tabular shape having a quadrate cross section and a corner thereof is notched to form a shape allowing attachment of base material 2 (in FIG. 1, it is notched in a shape of a triangular prism having a base surface of a right triangle) to form a notch portion 7.

Base material 2 in the present invention can be realized in a conventionally known appropriate shape such as a triangular prism or a quadrangular prism, which shape is not specifically limited. FIG. 1 shows an example in which base material 2 is formed in a triangular prism shape having a base surface of a right triangle and is attached to notch portion 7 of base 6 described above.

As the CBN sintered body forming base material 2 in the present invention, a sintered body including 30-90 volume % of CBN powder and a remaining portion of a bonding material is preferably used. The bonding material of the remaining portion preferably includes at least one substance selected from the group consisting of nitrides, carbides, borides, and oxides of elements of 4a, 5a and 6a groups of the periodic system and solid solutions thereof, an aluminum compound and an unavoidable impurity. The aluminum compound described here is, for example, an oxide, a boride or a nitride of aluminum. Though various CBN sintered bodies other than that described above are also known, the above-described base material is suitable for cutting quenched steel.

Base material 2 in the present invention has a surface on which surface covering film 3 is formed such that the CBN sintered body is exposed in a portion thereof. Herein, a CBN particle in the CBN sintered body exposed preferably contains at least one of Ti, Cr, Zr, V, and Ar at a depth of at least 0.05 μm from a surface of the CBN particle with a content of at most an amount of the unavoidable impurity. The "unavoidable impurity" means an impurity remaining in a manufacturing process of the CBN particle as raw material powder, and an amount thereof is at most 0.1 weight %. That is, the content of the element of "at most an amount of the unavoidable impurity" means that a composition equivalent to that of an original CBN particle is maintained. When at least two of Ti, Cr, Zr, V, and Ar are included at a depth of at most 0.05 μm from a surface of the CBN sintered body, a total amount thereof is at most the amount of the unavoidable impurity. It is to be noted that, the element defined here is not Ti or Zr included as a bonding phase of the CBN sintered body, but the element included in the CBN particle itself, which is a hard phase of the CBN sintered body.

The inventors have examined various causes of chipping and have found the following fact. When the surface covering film is formed with a PVD method on the CBN sintered body as the base material, cleaning of the base material such as ion bombardment is generally performed to increase adhesion between the surface covering film and the base material to improve a cutting property. As a result of detailed analysis and experiments as to the surface-covered CBN sintered body tool, however, the inventors have found a detrimental effect of the cleaning. That is, when the ion bombardment is performed, for example, an affected layer is formed in a surface layer portion of the CBN sintered body with implantation of a metal ion such as Ti or Cr or an Ar ion used in this process into the base material. It turned out that the affected layer became an origin of chipping or the like even when a thin surface covering film was formed. On the other hand, in a tool having the nega-land but not having the surface covering film, though cracking or chipping does not frequently occur on a nega-land surface, it appeared that wear of the flank is substantially advanced.

Each element Ti, Cr, Zr, V, or Ar is used in the ion bombardment and, in the base material subjected to this process, the element usually exists in the CBN particle located in the surface layer portion (a portion of a depth of at most 5 μm from the surface) of the CBN sintered body in an amount larger than the amount of the unavoidable impurity to form the affected layer. In the present invention, the CBN particle in the exposed CBN sintered body preferably contains at least one of Ti, Cr, Zr, V, and Ar at a depth of at least 0.05 μm from a surface of the CBN particle with a content of at most the amount of the unavoidable impurity so that the affected layer is substantially not formed. With this, the chipping or defect originating from the affected layer can be suppressed to attain a longer life. The wording "substantially not formed" indicates that, even when at least one of Ti, Cr, Zr, V, and Ar is contained at a depth of at least 0.05 μm from the surface of the CBN particle, a content thereof is at most the amount of the unavoidable impurity and the chipping resulting from advanced cracking originating from the affected layer does not occur. Whether the content of at least one of Ti, Cr, Zr, V, and Ar at a depth of at least 0.05 μm from the surface of the CBN particle is at most the amount of the unavoidable impurity or not can be checked by an analysis using, for example, an EDS (Energy Dispersive Spectrometer).

Though surface covering film 3 formed on base material 2 in the present invention is not specifically limited and can be formed with any conventionally known appropriate material to form a hard film highly resistant to wear, peeling and chipping, since the surface-covered CBN sintered body tool suitable for cutting of quenched steel can be realized, the surface covering film preferably includes a nitride or a carbonitride of a compound including at least one element selected from the group consisting of Ti, Cr, Zr, and V and at least one element selected from the group consisting of Al, Si and B, or a nitride or a carbonitride of Ti.

As "a nitride or a carbonitride of a compound including at least one element selected from the group consisting of Ti, Cr, Zr, and V and at least one element selected from the group consisting of Al, Si and B", TiAlN, TiSiAlCN, VZrAlN, CrAlN, CrAlCN, CrCN, CrBN, or the like can be specifically listed. In addition, "a nitride or a carbonitride of Ti" indicates TiN or TiCN. Among these, TiAlN, TiSiAlCN, CrAlCN, or TiCN, which is highly resistant to wear, is preferred.

Whether "a nitride or a carbonitride of a compound including at least one element selected from the group consisting of Ti, Cr, Zr, and V and at least one element selected from the group consisting of Al, Si and B" or "a nitride or a carbonitride of Ti" is included in surface covering film 3 in the surface-covered CBN sintered body tool of the present invention or not can be checked by an analysis using, for example, an XRD (X-Ray Diffractometer).

Though a thickness of surface covering film 3 in the present invention is not specifically limited, it is preferably 0.1-5 μm and, more preferably, 0.5-2 μm. It is because, a sufficient effect of forming surface covering film 3 may not be obtained with the thickness of surface covering film 3 less than 0.1 μm, while chipping may occur in surface covering film 3 during formation of nega-land 4 when the thickness of surface covering film 3 is larger than 5 μm.

Base material 2 in the present invention has a corner beveled to form nega-land 4. One of important points of the present invention is that nega-land 4 has a construction to expose the CBN sintered body, which is base material 2, in at least a portion thereof. With this, the surface-covered CBN sintered body tool can be attained which avoids cracking of the surface covering film of the nega-land which occurs in a conventional tool and suppresses chipping, and has high defect resistance and wear resistance. The surface-covered CBN sintered body tool as such can be suitably used particularly for a purpose in which defect resistance of the tool is required, such as interrupted cutting of quenched steel.

Though nega-land 4 in the present invention may expose the CBN sintered body, which is base material 2, in at least a portion thereof, in a preferred example, the CBN sintered body is exposed in a whole portion thereof It is advantageous to expose the CBN sintered body in the whole portion of nega-land 4 because generation of cracks in the nega-land can be suppressed in various cutting conditions, and it is also advantageous in terms of a manufacturing cost.

In addition, nega-land 4 may be realized in the present invention so as to expose the CBN sintered body in at least a portion associated with a cutting cross section. Since a portion of nega-land 4 other than that associated with the cutting cross section is not directly involved in cutting, surface covering film 3 may be formed thereon. The "cutting cross section" described here indicates a cross-sectional shape of a portion of a tool which contacts with a work material, which shape is determined with a shape of the tool as well as a depth of cut and a feed rate.

Nega-land 4 in the surface-covered CBN sintered body tool of the present invention has a width W of preferably 0.05-0.2 mm and, more preferably, 0.1-0.15 mm. When width W of nega-land 4 is less than 0.05 mm, the cutting cross section extends beyond a nega-land portion in many situations, though it depends on a cutting condition, and thus a sufficient effect of the present invention may not be obtained. When width W is larger than 0.2 mm, on the other hand, a volume of removal for forming the nega-land is increased and thus the manufacturing cost may be increased. It is to be noted that, width W of nega-land 4 represents, in a cross section shown in FIG. 1, a projected length on a face 11 of a distance from an edge 10 of intersection of an inclined surface of nega-land 4 and flank 5 to an edge 12 of intersection of the inclined surface of nega-land 4 and face 11.

In the present invention, width W of nega-land 4 is also closely related to a cutting condition. In turning, for example, a feed rate per one rotation is preferably made smaller than width W of nega-land 4. A work material strikes nega-land 4 of the tool, and a chip generated curls on face 11 and is removed. In the surface-covered CBN sintered body tool of the present invention, since surface covering film 3 is not formed on nega-land 4 on which the work material strikes as described above, chipping due to cracking does not occur and stable long-term cutting is enabled.

In the surface-covered CBN sintered body tool of the present invention, surface roughness of the nega-land portion exposing the CBN sintered body also relates to a cutting property. Arithmetic mean surface roughness Ra of the nega-land portion exposing the CBN sintered body is preferably expressed as $0.3 \leq Ra(min)/Ra(max) \leq 0.8$, where Ra(min) represents surface roughness in a direction parallel to a grinding direction of a grinder and Ra(max) represents surface roughness in a direction perpendicular to the grinding direction of the grinder. It is to be noted that, the aforementioned arithmetic mean surface roughness Ra is that of JIS. Ra(min)/Ra(max) is dependent on a particle size of the grinder used to grind the nega-land. Ra(min)/Ra(max) tends to decrease when the particle size becomes larger and increase when it becomes smaller. When honing is performed on the nega-land surface using a rotating brush and diamond grains, for example, since minute abrasive lines are randomly arranged, Ra(min)/Ra(max) becomes approximately 1. When Ra(min)/Ra(max) is less than 0.3, projections and depressions of the abrasive lines become excessively large, which may become origin of chipping. Since high residual stress of compression is applied within a range of $0.3 \leq Ra(min)/Ra(max) \leq 0.8$, propagation of a crack is suppressed with high effectiveness. When Ra(min)/Ra(max) is larger than 0.8, residual stress of tensility is applied and therefore the crack may be easily propagated.

Another important point in surface-covered CBN sintered body tool 1 of the present invention is that flank 5 has surface covering film 3. That is, since the work material does not initially strike the flank at biting of an edge portion during the interrupted cutting, a crack is not easily generated on the flank even when the surface covering film is formed thereon, and wear of the flank is suppressed with the surface covering film without decreasing life of the tool, which can attain a long-life tool. It is to be noted that, though a phenomenon in which the crack is not easily generated on the surface covering film of the flank in the tool of the present invention is markedly observed especially in the interrupted cutting, a similar effect is also obtained in continuous cutting.

Figure 2:
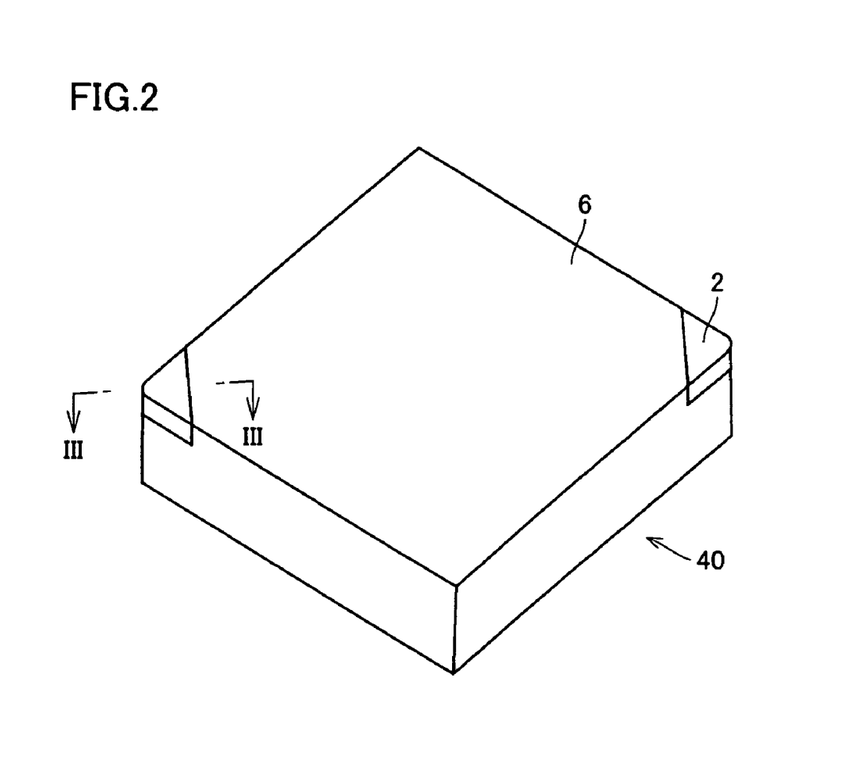
FIG. 2 is a perspective view of a tool material used in the tool of the present invention.
Figure 3A:
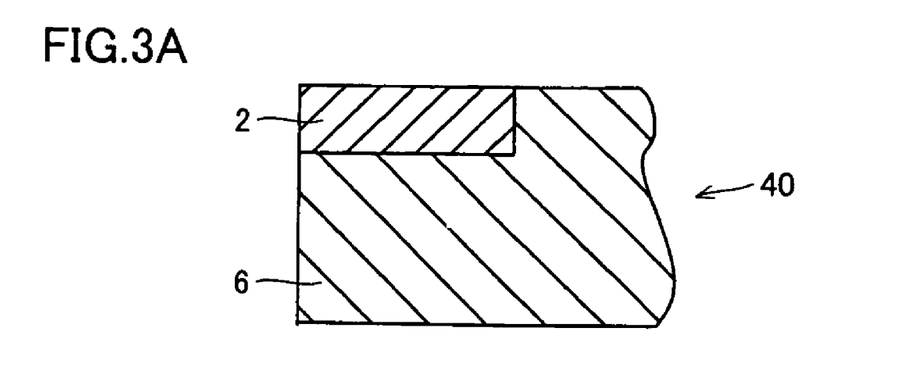
FIG. 3A shows a step of preparing the tool material in manufacturing of the surface-covered CBN sintered body tool of the present invention.
Figure 3B:
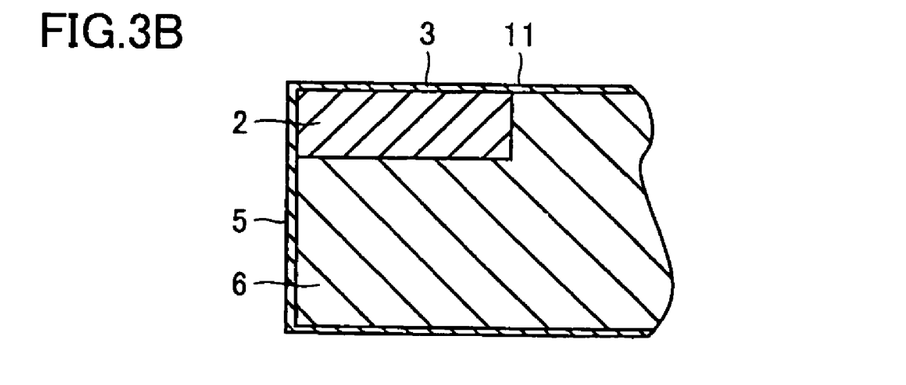
FIG. 3B shows a step of forming a surface covering film in manufacturing of the surface-covered CBN sintered body tool of the present invention.
Figure 3C:
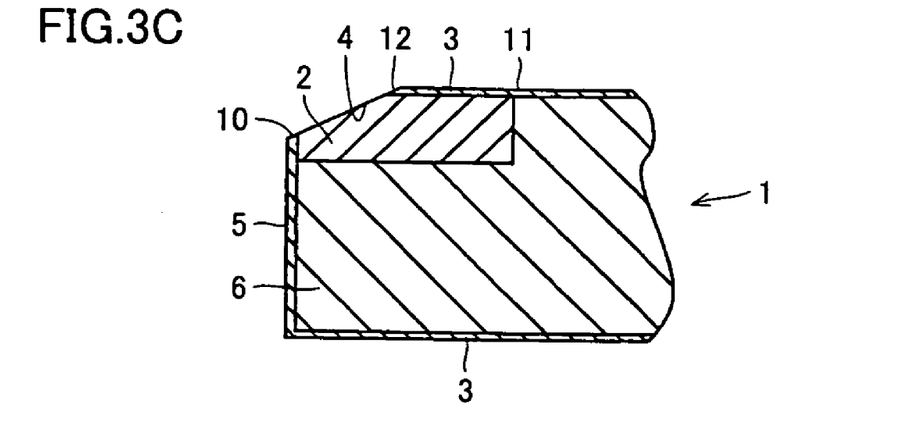
FIG. 3C shows a step of forming a nega-land in manufacturing of the surface-covered CBN sintered body tool of the present invention.

The present invention also provides a method of manufacturing the surface-covered CBN sintered body tool of the present invention as described above. FIG. 2 is a perspective view schematically showing a tool material 40 used in the method of the present invention. FIGS. 3A-3C are cross-sectional views of successive steps of the method of the present invention. It is to be noted that, FIG. 3A is a cross-sectional view taken along the section line III-III in FIG. 2. The method of manufacturing the surface-covered CBN sintered body tool according to the present invention includes the step of forming a surface covering film with a PVD method on a surface of a tool material having a cutting edge portion of a CBN sintered body, which surface covering film includes a nitride or a carbonitride of a compound including at least one element selected from the group consisting of Ti, Cr, Zr, and V and at least one element selected from the group consisting of Al, Si and B, or a nitride or a carbonitride of Ti, and the step of forming a nega-land to expose the CBN sintered body in at least a portion thereof. The method of the present invention will now be described in a step-by-step manner.

In the method of the present invention, first, tool material 40 is prepared (FIG. 3A). One type of tool material 40 (FIG. 2) is formed by attaching base material 2 formed with the CBN sintered body with brazing, for example, to notch portion 7 formed in advance on base 6 formed with a cemented carbide, while another type is formed with the CBN sintered body in whole. The type formed by attaching base material 2 to base 6 is further divided into a one-layer type in which base material 2 is formed with the CBN sintered body alone, and a two-layer type including two layers of the CBN sintered body and the cemented carbide. Any of the aforementioned types can be used as tool material 40 in the present invention. FIGS. 2 and 3 show tool material 40 into which base material 2 formed with one layer of the CBN sintered body is integrated with brazing in a pair of diagonal positions of base 6 made of a cemented carbide.

Then, surface covering film 3 is formed on a surface of tool material 40 with the PVD method. As shown in FIG. 3B, surface covering film 3 is formed on a whole surface of tool material 40 including a surface of base material 2 besides a surface of base 6. Naturally, surface covering film 3 is also formed on flank 5 and face 11.

The method of the present invention is characterized in that, surface covering film 3 formed includes a nitride or a carbonitride of a compound including at least one element selected from the group consisting of Ti, Cr, Zr, and V and at least one element selected from the group consisting of Al, Si and B, or a nitride or a carbonitride of Ti. Details of the material for forming surface covering film 3 are as described above.

Then, as shown in FIG. 3C, a corner of base material 2 as a cutting edge portion in tool material 40 is processed to form an inclined surface to form nega-land 4. This processing is performed with a strength to allow partial removal of the CBN sintered body, and is not a grinding process only to grind the surface covering film. The tool of the present invention can be manufactured with an economical speed by grinding with a diamond grinder or the like. With this processing for the nega-land, edges 10 and 12 are formed on tool material 40 in respective portions of intersection of flank 5 and nega-land 4 and intersection of nega-land 4 and face 11. As a result, the surface-covered CBN sintered body tool can be obtained in which at least a portion of nega-land 4 (a whole portion of nega-land 4 in a situation shown in FIG. 3C) does not have surface covering film 3 and exposes the CBN sintered body which is base material 2, while surface covering film 3 is formed on flank 5 and face 11.

For exposing the CBN sintered body in at least a portion of nega-land 4, one may form the nega-land in the tool material beforehand, mask the nega-land surface to avoid covering of the nega-land surface, and then form the surface covering film. It is, however, difficult to industrially mask a tool having a three-dimensional complex shape with accurately distinguishing the nega-land surface from the flank. In the method of the present invention, the CBN sintered body is exposed in at least a portion of nega-land 4 by forming surface covering film 3 on the whole tool material 40 and then forming the nega-land. With this, a reliable, accurate and economically advantageous method of manufacturing a surface-covered CBN sintered body tool can be provided. The method of the present invention also has an advantage that the affected layer can be easily removed.

The method of manufacturing the surface-covered CBN sintered body tool of the present invention preferably further includes the step of honing at least a portion of a periphery of the nega-land after the step of forming the nega-land. The honing step is performed in order to smoothly link portions of intersection of the nega-land and flank and intersection of the nega-land and face with curves. Smooth linkage of such portions of intersection of these surfaces can suppress occurrence of chipping due to intermittent shock and hard particles during cutting. That is, in the method of the present invention, only the periphery of the nega-land (edges 10 and 12 and proximal regions thereof) is further honed for rounding as shown in FIG. 1 to enable suppression of chipping of the surface covering film in the periphery.

More specifically, the honing step can be performed by applying a rotating brush and diamond grains or the like around the edges. With this, surface covering film 3 is mainly removed from the periphery of the nega-land, while a portion of base material 2 is hardly removed.

Though the present invention is described in more detail in the following with experimental examples, the present invention is not limited thereto.

EXPERIMENTAL EXAMPLE 1

Bonding material powder was obtained by mixing TiN and aluminum in a ratio of 80:20 by weight using a pot made of a cemented carbide and a ball. Then, the bonding material was mixed with CBN powder having an average particle diameter of 1 μm in a ratio of 35:65 by volume, and the resulting mixture was packed into a container made of Mo and was sintered in a pressure of 55 kb (5.6 GPa) at a temperature of 1450° C. for 20 minutes. When analyzed with an XRD (X-Ray Diffractometer), a sintered body included aluminum compounds which were probably aluminum nitride, aluminum oxide and aluminum boride. The sintered body was cut with electric discharge machining or a diamond grinder for use as a tip for a cutting tool. In this experimental example, a tool material for a completed product of model No. SNGN120408 was produced.

Next, a method of forming the surface covering film is described. In this experimental example, the surface covering film was formed on the tool material by ion plating with vacuum arc discharge. A target was made in the same composition as that of metal components of the covering film, and Ti-50 at % Al, Cr-50 at % Al, V-45 at % Al-10 at % Zr, Ti and Cr-5 at % B, Ti-45 at % Al-10 at % Si, or the like was used. Herein, "at %"represents atomic %. A film formation device was first depressurized to a degree of vacuum of $1.33 \times 10^{-3}$ Pa ($10^{-5}$ torr), and an Ar gas was introduced to perform cleaning with ion bombardment using an Ar ion and a metal ion forming the target with application of a bias voltage of $-1000$ V to the tip in an atmosphere of 1.33 Pa ($10^{-2}$ torr).

Then, the tip was heated to 500° C., the Ar gas was exhausted and then an $N_2$ gas was introduced as a reaction gas, and a voltage of $-120$ V was applied to the tip for covering with evaporation and ionization of the target with an arc current of 100 A by the vacuum arc discharge. A pressure was set to 1.33 Pa ($10^{-2}$ torr) and a thickness of the film was controlled with a covering time. After a surface of the tool material was covered as such, the nega-land was formed to produce a sample.

Table 1 shows a manufacturing condition and a film characteristic for each sample. When the covering film included C (carbon) in addition to N (nitrogen) as in sample No. 3 in Table 1, $CH_4$ in addition to $N_2$ was used as the reaction gas. Ratios of N and C in the covering film can be adjusted by controlling ratios of flow rates of $N_2$ and $CH_4$. A crystal system of the covering film was a cubic crystal structure.

grinding. In this experimental example, the nega-land was formed using a diamond grinder having a grain of a particle size of 800 meshes.

In each of sample Nos. 1-5 and 10-14, which are examples, the surface covering film on the nega-land was removed. For sample No. 10, the nega-land having an angle of 25° and a width of 0.19 mm was formed by grinding before the covering step, a TiAlN film of 1.0 µm was formed on the flank and the face, and then the nega-land having an angle of 25° and a width of 0.2 mm was formed by grinding, which was followed by honing. For each of sample Nos. 1-5 and 11-14, on the other hand, the nega-land having the angle of 25° and width of 0.2 mm was formed by grinding after the covering step. Each of sample Nos. 1, 3, 4, and 6-14, which was subjected to the honing step, had an arc-like honed shape with a curvature of 0.02 mm. For each of sample Nos. 6-8 as comparative examples, the nega-land having the angle of 25° and width of 0.2 mm was formed by grinding.

Table 1 also shows thicknesses of the surface covering film measured on the flank and nega-land. The film thickness on the nega-land was zero in each example of sample Nos. 1-5, 10-14 since the nega-land was formed after the covering step. In each comparative example of sample Nos. 6-8, the surface covering film was also formed on the nega-land.

(Cutting Test 1)

Evaluation of each sample was made by cutting for 30 minutes a work material having four U-shaped grooves in a

TABLE 1

| Sample No. | Processing Steps | Film Material | Film Thickness (µm) | | Y/X |
| | | | X (Flank) | Y (Nega-land) | |
|---|---|---|---|---|---|
| 1 Example | C→N→H | TiAlN | 1.0 | 0 | 0 |
| 2 Example | C→N | TiAlN | 1.2 | 0 | 0 |
| 3 Example | C→N→H | TiCN | 1.0 | 0 | 0 |
| 4 Example | C→N→H | TiN | 1.5 | 0 | 0 |
| 5 Example | C→N | TiN | 1.4 | 0 | 0 |
| 6 Comparative Example | N→H→C | TiAlN | 1.1 | 1.2 | 1.1 |
| 7 Comparative Example | N→C→H | TiAlN | 0.9 | 0.5 | 0.56 |
| 8 Comparative Example | N→C→H | TiAlN | 1.0 | 0.2 | 0.2 |
| 9 Comparative Example | N→H | — | 0 | 0 | 0 |
| 10 Example | N→C→N→H | TiAlN | 1.0 | 0 | 0 |
| 11 Example | C→N→H | TiSiAlCN | 1.0 | 0 | 0 |
| 12 Example | C→N→H | CrAlCN | 1.0 | 0 | 0 |
| 13 Example | C→N→H | VZrAlN | 1.0 | 0 | 0 |
| 14 Example | C→N→H | CrBN | 1.0 | 0 | 0 |

(In Table 1, characters C, N and H in a column "Processing Steps" have the following meanings. C: surface covering, N: nega-land formation, and H: honing.)

Processing steps of each sample will now be described referring to Table 1. Sample Nos. 1, 3, 4, and 11-14, which are examples, were honed after the nega-land formation. Each of samples of comparative examples (sample Nos. 6-8) was similarly produced by first forming the nega-land on the tool material and then performing the steps of surface covering and honing, as shown in Table 1. Sample No. 9 was produced by the nega-land formation and honing without the surface covering. In each step of nega-land formation, the nega-land having an angle of 25° and a width of 0.2 mm was formed by longitudinal direction with the tip described in Table 1. Results are shown in Table 2. As the work material, SCR420H (JIS) of quenched steel having a hardness adjusted to 58-62 HRC was used. A condition of a cutting test was as follows.

Work material: SCR420H (a work material having four U-shaped grooves in a longitudinal direction)

Cutting condition: Cutting speed V=120 mm/min.

Feed rate f=0.1 mm/rev.

Depth of cut d=0.15 mm

Wet, Cutting time 30 min.

Tool model No. SNGN120408

TABLE 2

| Sample No. | Flank Wear (mm) | Surface Roughness Rz (µm) | State of Damage | Evaluation |
|---|---|---|---|---|
| 1 Example | 0.085 | 2.7 | Normal Wear | Outstanding |
| 2 Example | 0.078 | 4.5 | 0.01 mm Minute Chipping | Good |

TABLE 2-continued

| Sample No. | Flank Wear (mm) | Surface Roughness Rz (μm) | State of Damage | Evaluation |
|---|---|---|---|---|
| 3 Example | 0.081 | 3.2 | Normal Wear | Outstanding |
| 4 Example | 0.135 | 1.9 | Normal Wear | Outstanding |
| 5 Example | 0.129 | 3.8 | 0.01 mm Minute Chipping | Good |
| 6 Comparative Example | — | — | 0.5 mm Defect in 6.2 min | Unsatisfactory |
| 7 Comparative Example | — | — | 0.5 mm Defect in 6.3 min | Unsatisfactory |
| 8 Comparative Example | — | — | 0.6 mm Defect in 8.2 min | Unsatisfactory |
| 9 Comparative Example | 0.217 | 3.8 | Large Wear, 0.06 mm Chipping | Satisfactory |
| 10 Example | 0.084 | 2.8 | 0.05 mm Minute Chipping | Good |
| 11 Example | 0.075 | 3.0 | Normal Wear | Outstanding |
| 12 Example | 0.074 | 3.1 | Normal Wear | Outstanding |
| 13 Example | 0.09 | 1.4 | Normal Wear | Outstanding |
| 14 Example | 0.095 | 1.2 | Normal Wear | Outstanding |

As shown in Table 2, each of sample Nos. 1-5 and 10-14, which are examples, had a life of at least 30 minutes. Among these, in each of sample Nos. 1, 3, 4 and 11-14, a state of damage of the tool was normal wear since it was honed. As a result, it can be said that processing of the work material with a small surface roughness Rz and thus a good surface condition was enabled. For sample No. 2 or 5 which was not honed, minute chipping was observed and surface roughness Rz of the work material was larger than that with a honed sample. Therefore, the honed sample can be considered superior.

In sample Nos. 6-8, which were comparative examples formed by the surface covering after the nega-land formation, defects were produced after cutting times of 6.2, 6.3 and 8.2 minutes, respectively. It can be seen from Table 1 that the smaller a value Y/X is, the longer a time required to produce the defect becomes. In sample No. 9 of the comparative example, wear became larger as the cutting time extended and the chipping occurred after cutting for 30 minutes. When the wear of the flank increases, a cutting resistance increases and chipping easily occurs, which means that the life of the sample is nearly ended.

Sample Nos. 1-5 and 11-14 of the examples could attain longer life than sample No. 10 of the example though they had similar shapes of edge portions and the surface covering films similarly removed from the nega-lands. A surface of each nega-land of the CBN sintered body base material after removal of the surface covering film was analyzed with an EDS (Energy Dispersive Spectrometer). As a result, while existence of the element used for cleaning by ion bombardment such as Ti, Cr, Zr, V or Ar was recognized in a central portion of a CBN particle of sample No. 10, Ti, Cr, Zr, V or Ar was not detected in sample Nos. 1-5 and 11-14. As a result of a detailed analysis of damaged portions of the edge portions after cutting, it became obvious that, in each of sample Nos. 1-5 and 11-14 which had a larger removal amount during grinding as compared with sample No. 10, the affected layer generated in an interface between the surface covering film and the CBN sintered body could be completely removed, and therefore generation of the crack to be an origin of the chipping or defect could be suppressed.

Though the tools of sample Nos. 1-5 and 11-14 are superior from a viewpoint of increased defect resistance, these tools require large removal amounts, which increase costs of manual formation of the nega-lands. When a method of forming the nega-land as performed for sample No. 10 is employed, on the other hand, since a first stage of the nega-land formation can be performed with a commercially available automatic peripheral grinding machine, the removal amount of manual formation of the nega-land after the surface covering can be decreased, which is advantageous in terms of the cost.

(Cutting Test 2)

Cutting tests were performed using the surface-covered CBN sintered body tool of model No. SNGN120408 produced in example 1 and the like. A round bar of SCR420H was used as a work material. A condition of continuous cutting was as follows. Results are shown in Table 3.

Work material: SCR420H round bar (outside diameter turned)

Cutting condition: Cutting speed V=150 mm/min.

Feed rate f=0.1 mm/rev.

Depth of cut d=0.1 mm

Dry, Cutting time 50 min.

TABLE 3

| Sample No. | Flank Wear (mm) | Surface Roughness Rz (μm) | State of Damage | Evaluation |
|---|---|---|---|---|
| 1 Example | 0.102 | 2.5 | Normal Wear | Outstanding |
| 2 Example | 0.095 | 3.9 | Minute Chipping | Good |
| 3 Example | 0.11 | 3 | Normal Wear | Outstanding |
| 4 Example | 0.21 | 1.8 | Normal Wear | Outstanding |
| 5 Example | 0.195 | 2.9 | Minute Chipping | Good |
| 6 Comparative Example | 0.115 | 5.2 | Minute Peeling | Satisfactory |
| 7 Comparative Example | 0.12 | 4.9 | Minute Peeling | Satisfactory |
| 8 Comparative Example | 0.1 | 4.7 | Minute Peeling | Satisfactory |
| 9 Comparative Example | 0.253 | 5.7 | Large Wear | Unsatisfactory |

Surface roughness Rz of the work material was smaller and a fine finished surface could be obtained in the example as compared with the comparative example. In particular, the honed sample had the state of damage of normal wear and could attain a better finished surface as compared with sample No. 2 or 5 which was not honed. It is to be noted that, the "minute peeling" described in a column of the state of damage in Table 3 means that the film in a minute region came unstuck and the CBN sintered body was exposed. In this situation, a step is formed in a cutting edge ridgeline portion, which step is transferred to a surface of the work material and thus the surface roughness of the work material is deteriorated.

Industrial Applicability

The surface-covered CBN sintered body tool of the present invention has high wear resistance, a low possibility of chipping and a long life. In addition, a desirable surface roughness of a suitable work material could be obtained. Therefore, the surface-covered CBN sintered body tool of the present invention can be utilized for interrupted or continuous cutting of quenched steel or the like.

The invention claimed is:

1. A surface-covered cubic boron nitride sintered body tool, comprising:
    a base material formed with a cubic boron nitride sintered body; and
    a surface covering film covering a surface of the base material; wherein:
    a nega-land exposing the cubic boron nitride sintered body in at least a portion thereof associated with a cutting cross section and a flank having the surface covering film are formed, and
    an intersection portion of the nega-land and the surface covering films at the flank is smoothly linked with a curve,
    the cubic boron nitride sintered body is exposed in a whole portion of the nega-land, and
    the nega-land has a width W of 0.05-0.2 mm.

2. The surface-covered cubic boron nitride sintered body tool according to claim 1, wherein
    arithmetic mean surface roughness Ra of a portion of the nega-land exposing the cubic boron nitride sintered body is expressed as $0.3 \leq Ra(min)/Ra(max) \leq 0.8$, where Ra(min) represents surface roughness in a direction parallel to a grinding direction of a grinder and Ra(max) represents surface roughness in a direction perpendicular to the grinding direction of the grinder.

3. The surface-covered cubic boron nitride sintered body tool according to claim 1, wherein
    the surface covering film includes a nitride or a carbonitride of a compound including at least one element selected from the group consisting of Ti, Cr, Zr, and V and at least one element selected from the group consisting of Al, Si and B, or a nitride or a carbonitride of Ti.

4. The surface-covered cubic boron nitride sintered body tool according to claim 3, wherein
    arithmetic mean surface roughness Ra of a portion of the nega-land exposing the cubic boron nitride sintered body is expressed as $0.3 \leq Ra(min)/Ra(max) \leq 0.8$, where Ra(min) represents surface roughness in a direction parallel to a grinding direction of a grinder and Ra(max) represents surface roughness in a direction perpendicular to the grinding direction of the grinder.

5. A surface-covered cubic boron nitride sintered body tool, comprising:
    a base material formed with a cubic boron nitride sintered body; and
    a surface covering film covering a surface of the base material; wherein:
    a nega-land exposing the cubic boron nitride sintered body in at least a portion thereof associated with a cutting cross section and a flank having the surface covering film are formed, and
    a surface of the nega-land exposing the cubic boron nitride sintered body contains at least one of Ti, Cr, Zr, V, and Ar less than an amount detectable by an energy dispersive spectrometer.

6. The surface-covered cubic boron nitride sintered body tool according to claim 5, wherein
    the surface covering film includes a nitride or a carbonitride of a compound including at least one element selected from the group consisting of Ti, Cr, Zr, and V and at least one element selected from the group consisting of Al, Si and B, or a nitride or a carbonitride of Ti.

7. The surface-covered cubic boron nitride sintered body tool according to claim 6, wherein
    arithmetic mean surface roughness Ra of a portion of the nega-land exposing the cubic boron nitride sintered body is expressed as $0.3 \leq Ra(min)/Ra(max) \leq 0.8$, where Ra(min) represents surface roughness in a direction parallel to a grinding direction of a grinder and Ra(max) represents surface roughness in a direction perpendicular to the grinding direction of the grinder.

8. The surface-covered cubic boron nitride sintered body tool according to claim 6, wherein
    the cubic boron nitride sintered body is exposed in a whole portion of the nega-land.

9. The surface-covered cubic boron nitride sintered body tool according to claim 8, wherein
    the nega-land has a width W of 0.05-0.2 mm.

10. The surface-covered cubic boron nitride sintered body tool according to claim 5, wherein
    the cubic boron nitride sintered body is exposed in a whole portion of the nega-land.

11. The surface-covered cubic boron nitride sintered body tool according to claim 10, wherein
    the nega-land has a width W of 0.05-0.2 mm.

12. The surface-covered cubic boron nitride sintered body tool according to claim 5, wherein
    arithmetic mean surface roughness Ra of a portion of the nega-land exposing the cubic boron nitride sintered body is expressed as $0.3 \leq Ra(min)/Ra(max) \leq 0.8$, where Ra(min) represents surface roughness in a direction parallel to a grinding direction of a grinder and Ra(max) represents surface roughness in a direction perpendicular to the grinding direction of the grinder.

13. The surface-covered cubic boron nitride sintered body tool according to claim 5, wherein an intersection portion of the nega-land and the surface covering films at the flank is smoothly linked with a curve.

14. A method of manufacturing a surface-covered cubic boron nitride sintered body tool, comprising the steps of:
    forming a surface covering film with a PVD method on a surface of a tool material having a cutting edge portion of a cubic boron nitride sintered body, said surface covering film includes a nitride or a carbonitride of a compound including at least one element selected from the group consisting of Ti, Cr, Zr, and V and at least one element selected from the group consisting of Al, Si and B, or a nitride or a carbonitride of Ti;
    forming a nega-land to expose the cubic boron nitride sintered body in at least a portion thereof associated with a cutting cross section; and
    after forming the nega-land, forming an intersection portion of the nega-land and the surface covering films smoothly linked with a curve by a honing process, wherein:
    the cubic boron nitride sintered body is exposed in a whole portion of the nega-land, and
    the nega-land has a width W of 0.05-0.2 mm.

15. The method of claim 14, wherein the step of forming a nega-land is performed so that a surface of the nega-land exposing the cubic boron nitride sintered body -contains at least one of Ti, Cr, Zr, V, and Ar less than an amount detectable by an energy dispersive spectrometer.

* * * * *